(12) United States Patent
Routamaa et al.

(10) Patent No.: US 10,875,205 B2
(45) Date of Patent: Dec. 29, 2020

(54) METHOD AND DEVICE FOR CUTTING OFF ONE OR MORE SAMPLE REGIONS FROM A SAMPLE CARRIER

(71) Applicant: WALLAC OY, Turku (FI)

(72) Inventors: Mika Olavi Routamaa, Lieto (FI); Jouni Henrik Reivolahti, Turku (FI); Jarmo Sakari Korpi, Turku (FI); Ilari Torsti, Turku (FI); Kimmo Sakari Laine, Turku (FI)

(73) Assignee: WALLAC OY, Turku (FI)

( * ) Notice: Subject to any disclaimer, the term of this patent is extended or adjusted under 35 U.S.C. 154(b) by 60 days.

(21) Appl. No.: 15/978,417

(22) Filed: May 14, 2018

(65) Prior Publication Data

US 2018/0333884 A1   Nov. 22, 2018

Related U.S. Application Data

(63) Continuation of application No. 13/980,455, filed as application No. PCT/FI2012/050014 on Jan. 9, 2012, now abandoned.

(Continued)

(30) Foreign Application Priority Data

Jan. 21, 2011   (FI) ..................... 20115057

(51) Int. Cl.
*B26D 5/00*   (2006.01)
*G01N 1/28*   (2006.01)

(52) U.S. Cl.
CPC ............. *B26D 5/007* (2013.01); *G01N 1/286* (2013.01); *G01N 1/2813* (2013.01);
(Continued)

(58) Field of Classification Search
CPC ...... B26D 5/007; G01N 1/286; G01N 1/2813; G01N 2001/282; G01N 2001/288; Y10T 83/533; Y10T 83/04
(Continued)

(56) References Cited

U.S. PATENT DOCUMENTS 5,460,057 A * 10/1995 Ostrup ................... B01L 3/545
                                                    422/65
5,641,682 A *  6/1997 Pagels ................... G01N 35/02
                                                    422/63
(Continued)

FOREIGN PATENT DOCUMENTS

WO    01/31317      5/2001
WO    2009/130378   10/2009

OTHER PUBLICATIONS

International Search Report, dated Apr. 27, 2012, from corresponding PCT application.
(Continued)

*Primary Examiner* — Ghassem Alie
(74) *Attorney, Agent, or Firm* — Nixon & Vanderhye

(57) ABSTRACT

A device for cutting off one or more sample regions from a sample carrier that contains impregnated sample material, e.g. blood, is described. The device includes: a cutting unit (103) for cutting off the one or more sample regions from the sample carrier, an optical imaging unit (101) for producing an electronic image of the sample carrier, and a processor (102) for controlling a display screen (108) to display the image (104) and one or more indicators (105, 105') each expressing the location of one sample region to be cut off. Thus, an operator of the device is enabled to monitor, without direct visual communication to the sample carrier, what region or regions of the sample carrier is/are to be cut off. As no direct visual communication with the sample (Continued)

carrier is needed, the working ergonomics of the operator can be improved.

21 Claims, 2 Drawing Sheets

Related U.S. Application Data

(60) Provisional application No. 61/434,935, filed on Jan. 21, 2011.

(52) U.S. Cl.
CPC . *G01N 2001/282* (2013.01); *G01N 2001/288* (2013.01); *Y10T 83/04* (2015.04); *Y10T 83/533* (2015.04)

(58) Field of Classification Search
USPC .......................................... 83/13, 533, 4, 365
See application file for complete search history.

(56) References Cited

U.S. PATENT DOCUMENTS

| | | | |
|---|---|---|---|
| 5,689,247 A | 11/1997 | Weiner | |
| 6,017,767 A * | 1/2000 | Chandler | B01L 3/5023 422/408 |
| 6,729,215 B2 | 5/2004 | Nishina et al. | |
| 6,930,764 B2 * | 8/2005 | Schutze | G01N 1/2813 356/36 |
| 6,993,768 B2 | 1/2006 | Sasnowitz | |
| 7,054,477 B2 | 5/2006 | Hsu | |
| 7,199,879 B2 * | 4/2007 | Harju | G01N 21/6452 250/458.1 |
| 7,723,099 B2 | 5/2010 | Miller et al. | |
| 7,745,204 B1 | 6/2010 | Aidun et al. | |
| 7,848,552 B2 * | 12/2010 | Schutze | G01N 1/2813 382/128 |
| 7,866,223 B2 | 1/2011 | Jenkins et al. | |
| 8,012,101 B2 * | 9/2011 | Lehtinen | A61B 10/0045 600/562 |
| 8,133,671 B2 * | 3/2012 | Williams | B01L 3/5027 435/6.1 |
| 8,273,579 B2 * | 9/2012 | Morrison | G01N 21/8483 356/369 |
| 8,293,497 B2 * | 10/2012 | Schutze | B01L 3/5025 435/40.52 |
| 8,431,078 B2 * | 4/2013 | Schutze | B01L 9/523 356/244 |
| 8,567,267 B2 * | 10/2013 | Lehtonen | B01L 99/00 73/864.41 |
| 8,685,749 B2 * | 4/2014 | Shoemaker | B01L 3/50255 436/178 |
| 8,715,955 B2 * | 5/2014 | Donovan | G01N 1/44 156/251 |
| 8,742,367 B2 * | 6/2014 | Laitinen | G01J 3/10 250/458.1 |
| 8,846,313 B2 * | 9/2014 | Steinmetzer | B01J 19/0046 435/6.1 |
| 9,005,543 B2 * | 4/2015 | Grenz | G01N 1/286 422/501 |
| 2001/0032533 A1 | 10/2001 | Sekiya | |
| 2004/0074410 A1 | 4/2004 | Domes | |
| 2004/0085443 A1 * | 5/2004 | Kallioniemi | G01N 1/36 348/135 |
| 2004/0146434 A1 | 7/2004 | Kane et al. | |
| 2004/0252291 A1 | 12/2004 | Schutze | |
| 2005/0066751 A1 | 3/2005 | Harris | |
| 2006/0012773 A1 | 1/2006 | Schutze et al. | |
| 2006/0139621 A1 * | 6/2006 | Baer | G01N 1/2813 356/36 |
| 2006/0199169 A1 | 9/2006 | Lam et al. | |
| 2006/0243110 A1 * | 11/2006 | Ostermann | B26D 7/1818 83/128 |
| 2006/0280360 A1 * | 12/2006 | Holub | G01J 3/02 382/162 |
| 2007/0066967 A1 * | 3/2007 | Sieckmann | G01N 1/2813 606/10 |
| 2007/0160280 A1 | 7/2007 | Schutze et al. | |
| 2007/0180965 A1 * | 8/2007 | Ito | G01N 1/06 83/73 |
| 2008/0019596 A1 * | 1/2008 | Seher | G01N 35/00584 382/224 |
| 2008/0093025 A1 | 4/2008 | Yamamoto et al. | |
| 2008/0128396 A1 * | 6/2008 | Shigematsu | B23K 26/702 219/121.67 |
| 2008/0308727 A1 | 12/2008 | Boguslaysky et al. | |
| 2009/0012505 A1 | 1/2009 | Chernyak | |
| 2009/0098560 A1 * | 4/2009 | Danks | C12N 15/1017 435/6.12 |
| 2011/0033872 A1 * | 2/2011 | Vaisanen | G01N 1/286 435/7.1 |
| 2011/0049385 A1 * | 3/2011 | Laitinen | G01J 3/18 250/458.1 |

OTHER PUBLICATIONS

Finnish Search Report, dated Mar. 13, 2013, from corresponding Finnish application.

* cited by examiner

METHOD AND DEVICE FOR CUTTING OFF ONE OR MORE SAMPLE REGIONS FROM A SAMPLE CARRIER

FIELD OF THE INVENTION

The invention relates to a method and a device for cutting off one or more sample regions from a sample carrier that contains impregnated sample material, e.g. dried blood. Furthermore, the invention relates to a computer program for controlling cutting off one or more sample regions from a sample carrier.

BACKGROUND

A conventional practice is to impregnate one or more drops of fluid to be examined onto a sample carrier, dry the sample carrier impregnated with the fluid, and then send the sample carrier to a laboratory for examination. The fluid to be examined can be, for example, blood of a newborn baby and the sample carrier can be, for example, a sheet of filter paper or some other suitable porous material which is able to absorb the fluid to be examined. In the laboratory, one or more regions containing the fluid to be examined, i.e. one or more sample regions, are cut off from the sample carrier and the piece that has been cut off is conveyed to a sample well of e.g. a microtitration plate or some other sample support element for further analysis. Each sample region can be cut off from the sample carrier for example with a punch and a die provided with a channel for the punch, where the punch is arranged to cut off the sample region with a single stroke through the sample carrier. It is also possible to use a cutting instrument capable of producing a localized, point-form cut on the sample carrier and to move the point-form cutting impact produced by the cutting instrument along the outer periphery of each sample region so as to detach the sample region from the sample carrier.

A device according to the prior art for cutting off one or more sample regions from a sample carrier comprises, in addition to a cutting unit for cutting off the sample regions, an optical imaging unit for producing an image of at least portion of the sample carrier and a processor for finding, from the image, a region which is distinguished from its surroundings so as to determine the locations of the sample regions on the sample carrier. The device further comprises a light source element, e.g. a light emitting diode, for illuminating or trans-illuminating a point-form region of the sample carrier. The processor is arranged to control the light source element so that a sample region determined by the processor to be cut off is illuminated or trans-illuminated. Therefore, an operator of the device can monitor what region of the sample carrier has been determined by the processor to be cut off, and thereafter the operator can either accept the processor-determined sample region to be the final sample region to be cut off or move the location of the sample region. An inconvenience related of the above-described device according to the prior art is that working posture of the operator of the device can be such that the working ergonomics of the operator is not on a satisfying level.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention, there is provided a new device for cutting off one or more sample regions from a sample carrier that contains impregnated sample material, e.g. blood. The device according to the invention comprises:

an optical imaging unit for producing an image of at least portion of the sample carrier,
a cutting unit for cutting off the one or more sample regions from of the sample carrier, and
a processor arranged to a) carry out an image analyzing algorithm for finding, from the image, a region which is distinguished from its surroundings so as to determine the location/locations of the one or more sample regions to be cut off, b) control accordingly a mutual position of the cutting unit and the sample carrier, and c) control a display screen to display the image and, on top of the image, one or more indicators each of which expressing the location of one sample region to be cut off from the sample carrier so as to enable an operator of the device to monitor, without direct visual communication to the sample carrier, what region/regions of the sample carrier is/are to be cut off.

As the operator can monitor the situation from the display screen, there is no need for the direct visual communication to the sample carrier and thus the working posture of the operator can be such that the working ergonomics is better than when using the device according to the prior art described earlier in this document. Furthermore, the sample carrier or a part of it can be shown on the display screen bigger than the real size. Also this can be utilized for improving the working ergonomics.

The processor is arranged to carry out an image analyzing algorithm for finding, from the image, a region which is distinguished from its surroundings so as to determine the location of the one or more sample regions to be cut off, and to control accordingly the mutual position of the cutting unit and the sample carrier. It is also possible that the processor first generates, using the image analyzing algorithm, a proposal for the location/locations of the one or more sample regions to be cut off, and then the operator has an opportunity to change the location of each sample region with the aid of the user interface.

The device may comprise the display screen as a part of the device and/or the device may comprise a signal interface for connecting to an external display unit comprising the display screen. In a case in which the display screen is a part of the device, the display screen can be mechanically supported to a body of the device with adjustable support elements which allow the position of the display screen to be changed according to the needs of the operator. A separate display unit can be connected to the device with a corded or cordless data transfer link. The processor of the device can comprise one or more processor units each of which can be a programmable processor unit, an application specific hardware unit, or a configurable hardware unit.

In accordance with the second aspect of the invention, there is provided a new method for cutting off one or more sample regions from a sample carrier that contains impregnated sample material. The method comprises:

producing optically an image of at least portion of the sample carrier,
using an image analyzing algorithm for finding, from the image, a region which is distinguished from its surroundings so as to determine the location of the one or more sample regions on the sample carrier, displaying the image on a display screen and displaying, on top of the image, one or more indicators each of which expressing the location of one sample region to be cut off from the sample carrier so as to enable an operator to monitor, without direct visual communication to the sample carrier, what region/regions of the sample carrier is/are to be cut off, and cutting off the one or more sample regions from the determined location of the sample carrier.

In accordance with the third aspect of the invention, there is provided a new computer program for controlling cutting off one or more sample regions from a sample carrier that contains impregnated sample material. The computer program comprises computer executable instructions for controlling a programmable processor to:

control an optical imaging unit to produce an image of at least portion of the sample carrier, carry out an image analyzing algorithm for finding, from the image, a region which is distinguished from its surroundings so as to determine the location/locations of the one or more sample regions to be cut off, and control accordingly a mutual position of a cutting unit and the sample carrier, control a display screen to display the image and, on top of the image, one or more indicators each of which expressing the location of one sample region to be cut off from the sample carrier so as to enable an operator to monitor, without direct visual communication to the sample carrier, what region/regions of the sample carrier is/are to be cut off, and control a cutting unit to cut off the one or more sample regions from the sample carrier.

A computer program product according to the invention comprises a non-volatile computer readable medium, e.g. a compact disc ("CD"), encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF THE EMBODIMENTS

Figure 1:
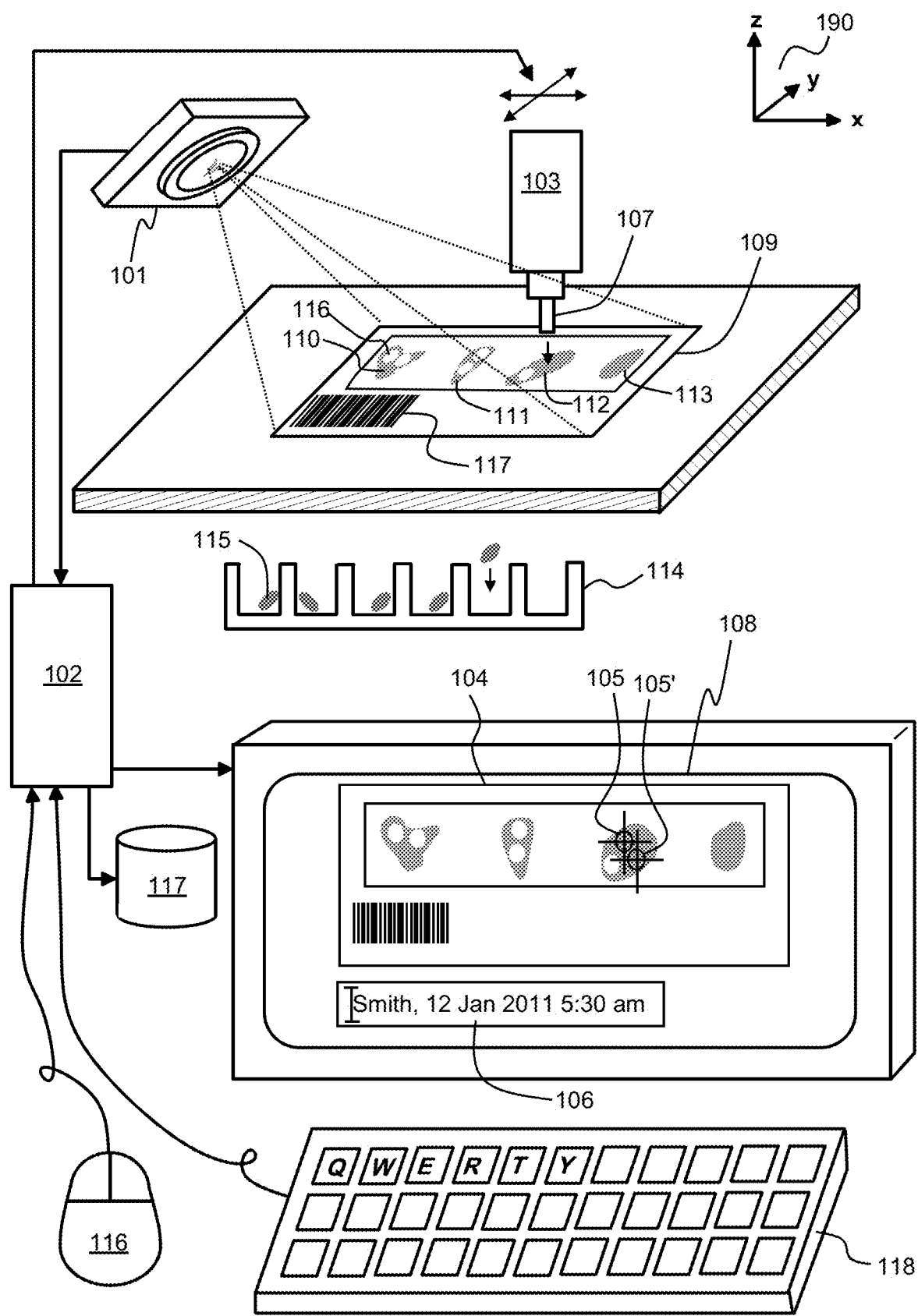
FIG. 1 shows an illustration of a device according to an exemplifying embodiment of the invention for cutting off one or more sample regions from a sample carrier that contains impregnated sample material, e.g. blood.

FIG. 1 shows an illustration of a device according to an exemplifying embodiment of the invention for cutting off one or more sample regions from a sample carrier that contains impregnated sample material. The sample carrier 109 may comprise, for example, a sheet of filter paper or some other suitable porous material which is able to absorb the sample material that can be e.g. blood of a newborn baby. Blotches 110, 111, 112 and 113 on the sample carrier 109 are the regions of the sample carrier into which the sample material has been impregnated. Sample regions are cut off from the regions of the sample carrier into which the sample material has been impregnated. After cutting, the detached sample regions are conveyed for further analysis to sample wells of a sample well element 114 that can be e.g. a microtitration plate. For example, a detached sample region 115 has been cut off from the region 110 that has a hole 116 on the place from which the sample region 115 has been cut off. The sample carrier may comprise a machine-readable identifier element 117 that may contain, for example, information about the donor of the sample material, information about the time and place of taking the sample, and/or other appropriate information.

The device for cutting off the one or more sample regions from the sample carrier comprises a cutting unit 103 for cutting off the one or more sample regions from desired location/locations of the sample carrier. In the exemplifying case shown in FIG. 1, the cutting unit comprises a punch 107 and a die provided with a channel for the punch. The punch is arranged to detach each sample region from the sample carrier 109 with a stroke through the sample carrier. The die is not shown in FIG. 1 because, in the exemplifying situation shown in FIG. 1, the die is covered by the sample carrier 109. In a device according to another embodiment of the invention, the cutting unit comprises a cutting instrument for producing a localized, point-form cut on the sample carrier and equipment for directing the cutting instrument so that the cutting impact produced by the cutting instrument is moved along the outer periphery of each sample region so as to cut off the sample region from the sample carrier. The above-mentioned cutting instrument can be, for example, a laser beam cutter or a liquid jet cutter.

The device comprises an optical imaging unit 101 for producing an electronic image of at least portion of the sample carrier 109. In the exemplifying case shown in FIG. 1, the optical imaging unit 101 is a digital camera but it is as well possible to use a scanner for producing the electronic image. The device comprises a processor 102 that is arranged to control a display screen 108 to display the image 104 and, on top of the image, one or more indicators 105, 105' each of which expressing the location of one sample region to be cut off from the sample carrier so as to enable an operator of the device to monitor, without direct visual communication to the sample carrier 109, what region/regions of the sample carrier is/are to be cut off. As the operator can monitor the situation from the display screen 108, there is no need for direct visual communication to the sample carrier and thus the working posture of the operator can be such that the working ergonomics can be sufficiently good.

In a device according to an advantageous embodiment of the invention, the processor 102 is arranged to use a suitable image analyzing algorithm for finding, from the image, a region which is distinguished from its surroundings with respect to e.g. color and/or brightness in order to determine the location of such a part of the sample carrier which has been impregnated with the sample material. The processor 102 is arranged to determine the location/locations of the one or more sample regions to be cut off so that the one or more sample regions belongs/belong as well as possible to the above-mentioned part which has been impregnated with the sample material. The processor can be, for example, arranged to compare brightness values of pixels of the image to a threshold value, where the result of the comparison with the threshold value determines whether or not an individual pixel belongs to the region which is deemed to be distinguished from its surroundings. In order to make the determination more independent of prevailing lightning conditions, the processor can be further arranged to determine the above-mentioned threshold value on the basis of an average or median brightness value of all pixels of the image or of a certain part of the image.

In a device according to an advantageous embodiment of the invention, the processor 102 is arranged to control the mutual position of the cutting unit 103 and the sample carrier 109 in the xy-plane of a coordinate system 190 so that the place of the sample carrier from which the sample region is to be cut off corresponds to the location of the indicator 105 or 105' on the display screen 108. Alternatively, it is possible that the operator is allowed to manually adjust the mutual position of the cutting unit 103 and the sample carrier 109, and the processor 102 is arranged to control the display screen 108 to show the indicator 105 expressing the sample region to be cut off according to the current mutual position of the cutting unit and the sample carrier. Mechanical support structures which support the cutting unit 103 are not shown in FIG. 1, but the mechanical support structures including possible servomotors and/or position sensors can be such as known from the prior art. For example, it is possible that the cutting unit is moved in the xy-plane and the sample carrier is stationary. On the other hand, it is also possible that the sample carrier is moved in the xy-plane and the cutting unit is stationary. The choice between different alternatives depends on the mechanical construction of the device.

In a device according an embodiment of the invention, the processor 102 is arranged to determine or change the location of a sample region to be cut off, control accordingly the mutual position of the cutting unit and the sample carrier, and update accordingly the location of the corresponding indicator 105 or 105' on the display screen 108 on the basis of a control signal received from the operator via a user interface. The user interface may comprise, for example, a computer mouse 116 or a joystick with the aid of which the operator can move the indicator 105 or 105' on the display screen 108 and accordingly move the location of the sample region to be cut off.

In a device according an embodiment of the invention, the processor 102 is arranged to use a suitable image analyzing algorithm for finding a machine-readable identifier element from the image produced with the optical imaging unit 101. The processor is further arranged to read from the machine-readable identifier element information encoded to the machine-readable identifier element and to save the information read from the machine-readable identifier element into a memory unit 117 for further use. In the exemplifying case shown in FIG. 1, the sample carrier 109 comprises the machine-readable identifier element 117 that can be captured into the image produced with the optical imaging unit 101. In the exemplifying situation shown in FIG. 1, the machine-readable identifier element comprises a bar code. The machine-readable identifier element may as well comprise a matrix code or a string of characters readable with an optical character recognition method "OCR" or a combination of the above-mentioned. The device may comprise the memory unit 117 as a part of the device and/or the device may comprise a data interface for connecting to an external memory unit.

In a device according an embodiment of the invention, the processor 102 is arranged to control the display screen 108 to display at least part of the information read from the machine-readable identifier element in a human readable form 106. The processor can be further arranged to change the displayed information on the basis of instructions given by the operator via the user interface and to save the changed information into the memory unit 117. The user interface may comprise a keyboard 118 with the aid of which the operator can change the information displayed on the display screen.

The device may comprise the display screen 108 as a part of the device and/or the device may comprise a signal interface for connecting to an external display unit comprising the display screen. In a case in which the display screen is a part of the device, the display screen can be mechanically supported to a body of the device with adjustable support elements which allow the position of the display screen to be changed according to the needs of the operator. A separate display unit can be connected to the device with a corded or cordless data transfer link. Correspondingly, the user interface equipment such as the computer mouse 116 and the keyboard 118 can be external units which are connected to the device with corded or cordless data transfer links.

The processor 102 may comprise one or more processor units each of which can be, independently of other processor units, a programmable processor unit, an application specific hardware unit, or a configurable hardware unit, e.g. a field programmable gate-array "FPGA".

Figure 2:
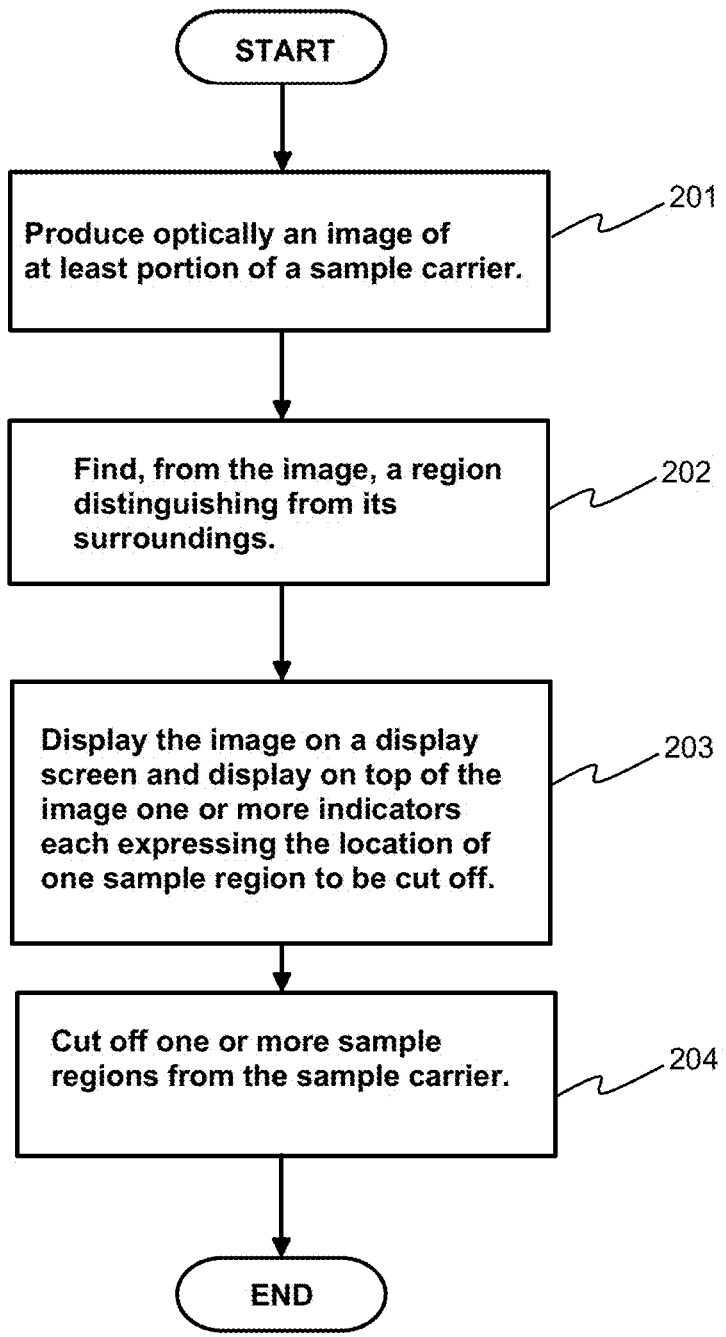
FIG. 2 shows a flow chart of a method according to an exemplifying embodiment of the invention for cutting off one or more sample regions from a sample carrier that contains impregnated sample material.

FIG. 2 shows a flow chart of a method according to an exemplifying embodiment of the invention for cutting off one or more sample regions from a sample carrier that contains impregnated sample material. The method comprises:
- in the phase 201: producing optically an electronic image of at least portion of the sample carrier; a digital camera or a scanner can be used for producing the image,
- in the phase 202: finding, from the image, a region which is distinguished from its surroundings so as to determine the location/locations of the one or more sample regions on the sample carrier,
- in the phase 203: displaying the image on a display screen and displaying, on top of the image, one or more indicators each of which expressing the location of one sample region to be cut off from the sample carrier so as to enable an operator to monitor, without direct visual communication to the sample carrier, what region/regions of the sample carrier is/are to be cut off, and
- in the phase 204: cutting off the one or more sample regions from the determined location of the sample carrier.

After cutting, the one or more detached sample regions can be conveyed for further analysis to a sample well element that can be e.g. a microtitration plate.

A method according to an advantageous embodiment of the invention comprises using a suitable image analyzing algorithm for finding, from the image, the region which is distinguished from its surroundings so as to determine the location/locations of the one or more sample regions to be cut off. The image analyzing algorithm may comprise, for example but not necessarily, comparing brightness values of pixels of the image to a threshold value, where the result of the comparison with the threshold value determines whether or not an individual pixel belongs to the region which is deemed to be distinguished from its surroundings. In order to make the determination more independent of prevailing lightning conditions, the image analyzing algorithm may comprise determining the threshold value on the basis of an average or median brightness value of all pixels of the image or of a certain part of the image.

A method according to an embodiment of the invention comprises receiving a control signal from the operator via a user interface, and on the basis of the control signal: determining or changing the location of a sample region to be cut off and updating accordingly the location of the corresponding indicator on the display screen.

A method according to an embodiment of the invention comprises using a suitable image analyzing algorithm for finding, from the image, a machine-readable identifier element, reading from the machine-readable identifier element information encoded to the machine-readable identifier element, and saving the information read from the machine-readable identifier element into a memory unit for further use.

In a method according to an embodiment of the invention, the machine-readable identifier element comprises at least one of the following: a bar code, a matrix code, a string of characters readable with an optical character recognition method.

A method according to an embodiment of the invention comprises displaying at least part of the information read from the machine-readable identifier element on the display screen in a human readable form.

A method according to an embodiment of the invention comprises changing the displayed information on the basis of instructions given by the operator via a user interface and saving the changed information into the memory unit.

In a method according to an embodiment of the invention, the one or more sample regions are cut off with a punch and a die provided with a channel for the punch, where the punch is capable of cutting off each sample region with a single stroke through the sample carrier. A method according to an alternative embodiment of the invention comprises moving a localized, point-form cutting impact produced by a cutting instrument along the outer periphery of each sample region so as to cut off the sample region from the sample carrier.

A computer program according to an embodiment of the invention comprises software modules for controlling cutting off one or more sample regions from a sample carrier that contains impregnated sample material. The software modules comprise computer executable instructions for controlling a programmable processor to:
control an optical imaging unit to produce an image of at least portion of the sample carrier,
control a display screen to display the image and, on top of the image, one or more indicators each of which expressing the location of one sample region to be cut off from the sample carrier so as to enable an operator to monitor, without direct visual communication to the sample carrier, what region/regions of the sample carrier is/are to be cut off, and
control a cutting unit to cut off the one or more sample regions from the sample carrier.

The software modules can be, for example, subroutines and functions generated with a suitable programming language.

The software modules of a computer program according to an advantageous embodiment of the invention comprises computer executable instructions for controlling a programmable processor to carry out an image analyzing algorithm for finding, from the image, a region which is distinguished from its surroundings so as to determine the location/locations of the one or more sample regions to be cut off, and to control accordingly a mutual position of the cutting unit and the sample carrier.

A computer program product according to an embodiment of the invention comprises a computer readable medium, e.g. a compact disc ("CD"), encoded with the above-mentioned software modules.

A signal according to an embodiment of the invention is encoded to carry information defining the above-mentioned software modules.

The specific examples provided in the description given above should not be construed as limiting. Therefore, the invention is not limited merely to the embodiments described above.

What is claimed is:

1. A method for cutting blood carriers, the method comprising:
   producing optically an image of at least a portion of the blood carrier, the blood carrier comprising one or more blood samples;
   using an image analyzing algorithm to:
      (i) find each of the blood samples located within the image of the at least a portion of the blood carrier, and
      (ii) for each blood sample found within the image of the at least a portion of the blood carrier, determine proposals for one or more locations within the found blood sample for cutting one or more sample regions from a selected blood sample on the blood carrier and identify each proposed location by an indicator;
   displaying the image on a display screen, and displaying one or more indicators identified by the image analyzing algorithm on top of the image with each indicator expressing the proposed location of one sample region to be cut off from the blood carrier;
   receiving a control signal from an operator via a user interface to determine or change the location of at least one indicator, and select one or more of the indicators; and
   cutting one or more sample regions from the blood carrier at locations identified by the selected one or more indicators.

2. The method according to claim 1, further comprising:
   using an image analyzing algorithm for finding a machine-readable identifier element in the image;
   reading the machine-readable identifier element to obtain information encoded in the machine-readable identifier element; and
   saving the information read from the machine-readable identifier element into a memory for later use.

3. The method according to claim 2, wherein the machine-readable identifier element comprises at least one of: a bar code, a matrix code, and a string of characters readable with an optical character recognition method.

4. The method according to claim 2, further comprising:
   displaying at least part of the information read from the machine-readable identifier element on the display screen in a human-readable form.

5. The method according to claim 4, further comprising:
changing the displayed information based on instructions given by the operator via the user interface and saving the changed information into the memory.

6. The method according to claim 1, wherein the one or more sample regions are cut off with a punch and a die provided with a channel for the punch, the punch being configured to cut off each sample region with a stroke through the blood carrier.

7. The method according to claim 1, further comprising:
moving a point-form cutting impact produced by a cutting instrument along the outer periphery of each sample region to cut off the sample region from the blood carrier.

8. The method according to claim 2, wherein the image analyzing algorithm further comprises comparing brightness values of pixels of the image to a threshold value, a result of the comparison with the threshold value determining whether or not an individual pixel belongs to the region which is distinguished from an area surrounding the region.

9. The method according to claim 8, wherein the image analyzing algorithm further comprises determining the threshold value based on an average or median brightness value of the pixels of the image or of a part of the image.

10. The method according to claim 1, wherein the blood carrier is filter paper.

11. A cutting device for a blood carrier, the cutting device comprising:
an optical imaging system configured to produce an image of at least a portion of the blood carrier, the blood carrier comprising one or more blood samples;
a cutting system configured to cut at least one sample region from a selected blood sample on the blood carrier; and
a processor configured to
carry out an image analyzing algorithm to:
(i) find each of the blood samples located within the image of the at least a portion of the blood carrier, and
(ii) for each blood sample found within the image of the at least a portion of the blood carrier, determine proposals for one or more locations within the found blood sample for cutting one or more sample regions from the blood carrier and identify each proposed location by an indicator,
control a display screen to display the image and one or more of the indicators identified by the image analyzing algorithm on top of the image with each indicator expressing the proposed location of one sample region to be cut off from the blood carrier,
receive a control signal from an operator via a user interface to determine or change the location of at least one of the indicators, and select one or more of the indicators, and
control a mutual position of the cutting system and the blood carrier to cut one or more sample regions at locations identified by the selected one or more indicators.

12. The device according to claim 11, wherein the processor is further configured to:
carry out an image analyzing algorithm for finding a machine-readable identifier element in the image,
read from the machine-readable identifier element information encoded to the machine-readable identifier element, and
save the information read from the machine-readable identifier element into a memory for later use.

13. The device according to claim 12, wherein the machine-readable identifier element comprises at least one of: a bar code, a matrix code, and a string of characters readable with an optical character recognition method.

14. The device according to claim 12, wherein the processor is further configured to control the display screen to display at least part of the information read from the machine-readable identifier element in a human-readable form.

15. The device according to claim 14, wherein the processor is further configured to change the displayed information based on instructions given by the operator via the user interface and to save the changed information into the memory.

16. The device according to claim 11, wherein the cutting system comprises a punch and a die provided with a channel for the punch, the punch being configured to cut off each sample region with a stroke through the blood carrier.

17. The device according to claim 11, wherein the cutting system comprises
a cutting instrument configured to produce a point-form cut on the blood carrier, and
equipment configured to direct the cutting instrument so that a cutting impact produced by the cutting instrument is moved along an outer periphery of each sample region to cut off the sample region.

18. The device according to claim 11, wherein the processor is further configured to compare brightness values of pixels of the image to a threshold value, a result of the comparison with the threshold value determining whether or not an individual pixel belongs to the region which is distinguished from an area surrounding the region.

19. The device according to claim 18, wherein the processor is further configured to determine the threshold value based on an average or median brightness value of the pixels of the image or of a part of the image.

20. The device according to claim 11, further comprising at least one of:
the display screen, and
a signal interface configured to connect to an external display unit comprising the display screen.

21. The device according to claim 11, wherein the blood carrier is filter paper.

* * * * *